US011962258B2

(12) United States Patent
Turpault et al.

(10) Patent No.: US 11,962,258 B2
(45) Date of Patent: Apr. 16, 2024

(54) DEVICE FOR ESTIMATING THE TEMPERATURE OF A STATOR COIL OF A MAGNETIC BEARING, ASSOCIATED MAGNETIC SUSPENSION SYSTEM AND METHOD FOR ESTIMATING THE TEMPERATURE OF A STATOR COIL

(71) Applicant: SKF Magnetic Mechatronics, Saint-Marcel (FR)

(72) Inventors: Stephane Marie Turpault, Paris (FR); Salim Benbouzid, Montigny-les-Cormeilles (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 0 days.

(21) Appl. No.: 17/873,198

(22) Filed: Jul. 26, 2022

(65) Prior Publication Data
US 2023/0050472 A1   Feb. 16, 2023

(30) Foreign Application Priority Data

Aug. 4, 2021   (FR) ...................................... 2108479

(51) Int. Cl.
*H02P 29/64* (2016.01)
*H02P 21/00* (2016.01)
*H02P 21/14* (2016.01)

(52) U.S. Cl.
CPC .......... *H02P 29/64* (2016.02); *H02P 21/0003* (2013.01); *H02P 21/14* (2013.01)

(58) Field of Classification Search
CPC ...... H02P 29/64; H02P 21/0003; H02P 21/14; F16C 41/004; F16C 32/0442; F16C 32/0444; F16C 2233/00; F16C 2360/42; F16C 32/0489; G01K 2217/00; G01K 7/16; G01K 7/42
USPC .......................................... 318/641, 638, 560
See application file for complete search history.

(56) References Cited

U.S. PATENT DOCUMENTS

| 8,487,575 | B2* | 7/2013 | Yeh ....................... H02P 29/664 |
| | | | 318/432 |
| 9,876,461 | B2* | 1/2018 | Lee .......................... H02P 27/08 |
| 10,498,285 | B2* | 12/2019 | Shin ........................ H02P 29/64 |
| 11,183,959 | B2* | 11/2021 | Wystup .................... H02P 29/64 |
| 2020/0044597 | A1 | 2/2020 | Tokimasa et al. |
| 2020/0280277 | A1 | 9/2020 | Wystup et al. |

FOREIGN PATENT DOCUMENTS

| EP | 2977733 A1 | 1/2016 |
| FR | 2892780 A1 | 5/2007 |

\* cited by examiner

*Primary Examiner* — David Luo
(74) *Attorney, Agent, or Firm* — GARCIA-ZAMOR INTELLECTUAL PROPERTY LAW, LLC; Ruy Garcia-Zamor

(57) ABSTRACT

A method for estimating the temperature of a stator coil of a magnetic suspension bearing of a rotor that is connected by connection wires to circuits for servo-controlling the position of the rotor includes the following steps: measuring the electric voltage at the terminals of the connection wires of the stator coil; measuring the intensity of the current passing through the stator coil; estimating the electric resistance of the stator coil and of the connection wires on the basis of an adaptive filter, the measured electric voltage and the intensity of the measured current; and estimating the temperature of the coil on the basis of the value of the estimated resistance.

6 Claims, 4 Drawing Sheets

DEVICE FOR ESTIMATING THE TEMPERATURE OF A STATOR COIL OF A MAGNETIC BEARING, ASSOCIATED MAGNETIC SUSPENSION SYSTEM AND METHOD FOR ESTIMATING THE TEMPERATURE OF A STATOR COIL

CROSS-REFERENCE TO RELATED APPLICATIONS

This application claims priority to French Patent Application no. 2108479, filed Aug. 4, 2021, the contents of which is fully incorporated herein by reference.

TECHNICAL FIELD

The present invention relates to magnetic suspension bearings, and more specifically relates to estimating the temperature of the stator coils of such bearings.

PRIOR ART

In general, a magnetic suspension rotary machine comprises two radial active magnetic bearings and a rotor rotatably supported by the two active magnetic bearings.

The rotary machine further comprises a magnetic axial stop absorbing the axial forces exerted on the rotor.

Each magnetic bearing comprises stator coils generating magnetic fields that keep the rotor levitated in the bearings.

The axial stop comprises two axial stator coils, each generating an axial magnetic field, the two coils being located opposite each other and being separated by a disc rigidly connected to the rotor shaft.

Conventionally, temperature probes are installed in the core of the radial and axial stator coils for measuring the temperature of the coils in order to protect them from overheating.

In order to improve the reliability of the temperature measurements, each stator coil is equipped with two redundant temperature probes, with one of these probes measuring the temperature.

When the probe measuring the temperature is faulty, the other probe is activated and delivers the value of the measured temperature.

However, the layout of the probes requires the passage of at least three wires per probe, thus involving the provision of a space for the passage of the wires and a significant amount of space being reserved in the connection cabinets, requiring larger cabinets.

In addition, the presence of a multitude of wires increases the likelihood of the failure of one of the wires, of a connection of a wire to a temperature probe or to a connection cabinet.

Furthermore, when the magnetic suspension rotary machine is used for underwater applications it is located on the seabed. As the connection cabinets are located above sea level, the wires are very long and require significant amounts of conductive material such as copper. The length of the wires also increases the likelihood of failure.

Document FR 2892780 proposes a method for estimating the temperature in a coil on the basis of voltage and current sensors that allows one of the redundant temperature probes to be removed without degrading the reliability of the temperature measurements.

However, implementing the temperature estimation method requires implementing a high precision, low voltage electronic measurement circuit and a laborious procedure for calibrating the circuit.

In light of the above, the invention proposes overcoming the aforementioned constraints.

SUMMARY OF THE INVENTION

Therefore, the aim of the invention is a method for estimating the temperature of a stator coil of a magnetic suspension bearing of a rotor and which is connected by connection wires to circuits for servo-controlling the position of the rotor, comprising:

measuring the electric voltage at the terminals of the connection wires of the stator coil;

measuring the intensity of the current passing through the stator coil;

estimating the electric resistance of the stator coil and of the connection wires on the basis of an adaptive filter, the measured electric voltage and the intensity of the measured current; and estimating the temperature of the coil on the basis of the value of the estimated resistance.

Implementing an adaptive filter does not require implementing a dedicated circuit for accurately measuring the current passing through each coil and the voltage at the terminals of each coil in order to accurately determine the resistance of the coils according to the temperature of the coils and subsequently estimating the temperature of the coils on the basis of the resistance.

Preferably, estimating the electric resistance of the stator coil and of the connection wires comprises:

filtering the measured electric voltage using a first-order filter;

filtering the intensity of the measured current using a first-order filter;

correcting the value of the estimated electric resistance in a closed loop on the basis of a deviation between the filtered voltage and the product of the estimated electric resistance and the intensity of the filtered current so that the deviation is zero, with the value of the estimated electric resistance being equal to the value of the corrected estimated electric resistance when the absolute value of the deviation is less than or equal to a predetermined value.

Advantageously, estimating the electric resistance of the stator coil and the connection wires comprises correcting the value of the electric resistance estimated in a closed loop on the basis of a deviation between the intensity of the current passing through the stator coil and the intensity of a current estimated on the basis of the measured voltage and the position of the rotor shaft in the stator of the magnetic bearing, with the value of the estimated electric resistance being equal to the value of the corrected estimated electric resistance when the absolute value of the deviation is less than or equal to a predetermined value.

Preferably, the adaptive filter comprises a recursive least squares algorithm, estimating the electric resistance of the stator coil and connection wires on the basis of an adaptive filter, the measured electric voltage and the intensity of the measured current comprises implementing the recursive least squares algorithm in order to define an affine relationship between the measured voltage and current intensity and the estimated electric resistance and a measurement bias of at least one of the measured values.

Advantageously, the method further comprises comparing the intensity of the measured current passing through the stator coil to an activation threshold, and comparing the time derivative of the estimated electric resistance to an inactivation threshold, and wherein, if the intensity of the measured current is below the activation threshold or the time derivative of the estimated electric resistance is above the inactivation threshold, the method comprises assigning the last value of the estimated resistance to the estimated resistance when the intensity of the measured current is above the activation threshold and the time derivative of the estimated electric resistance is below the inactivation threshold.

Preferably, estimating the temperature of the coil on the basis of the value of the estimated resistance comprises computing the estimated temperature on the basis of Matthiessen's rule connecting the estimated temperature to the estimate of the electric resistance, to a value of the electric resistance of the material of the coil at a reference temperature and to a characteristic temperature of the material of the coil at which the material has zero resistance at a pressure of 1 bar.

Advantageously, the method further comprises estimating a monitoring temperature of the coil on the basis of the estimated temperature of the coil and a first-order filter.

A further aim of the invention is a device for estimating the temperature of a stator coil of a magnetic suspension bearing of a rotor and which is connected by connection wires to circuits for servo-controlling the position of the rotor, comprising:

means for measuring the electric voltage at the terminals of the connection wires of the stator coil;

means for measuring the intensity of the current passing through the stator coil;

an adaptive filter configured to estimate the electric resistance of the stator coil and of the connection wires on the basis of the measured electric voltage and the intensity of the measured current; and means for estimating the temperature of the coil on the basis of the value of the estimated resistance.

Preferably, the device further comprises means for estimating a monitoring temperature of the coil.

A further aim of the invention is a magnetic suspension system comprising a magnetic suspension rotary machine comprising a magnetic suspension bearing supporting a rotor of the machine, and a temperature estimation device as defined above.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Further aims, features and advantages of the invention will become apparent from reading the following description, which is provided solely by way of a non-limiting example and with reference to the appended drawings, in which.

DETAILED DESCRIPTION OF THE INVENTION

Figure 1:
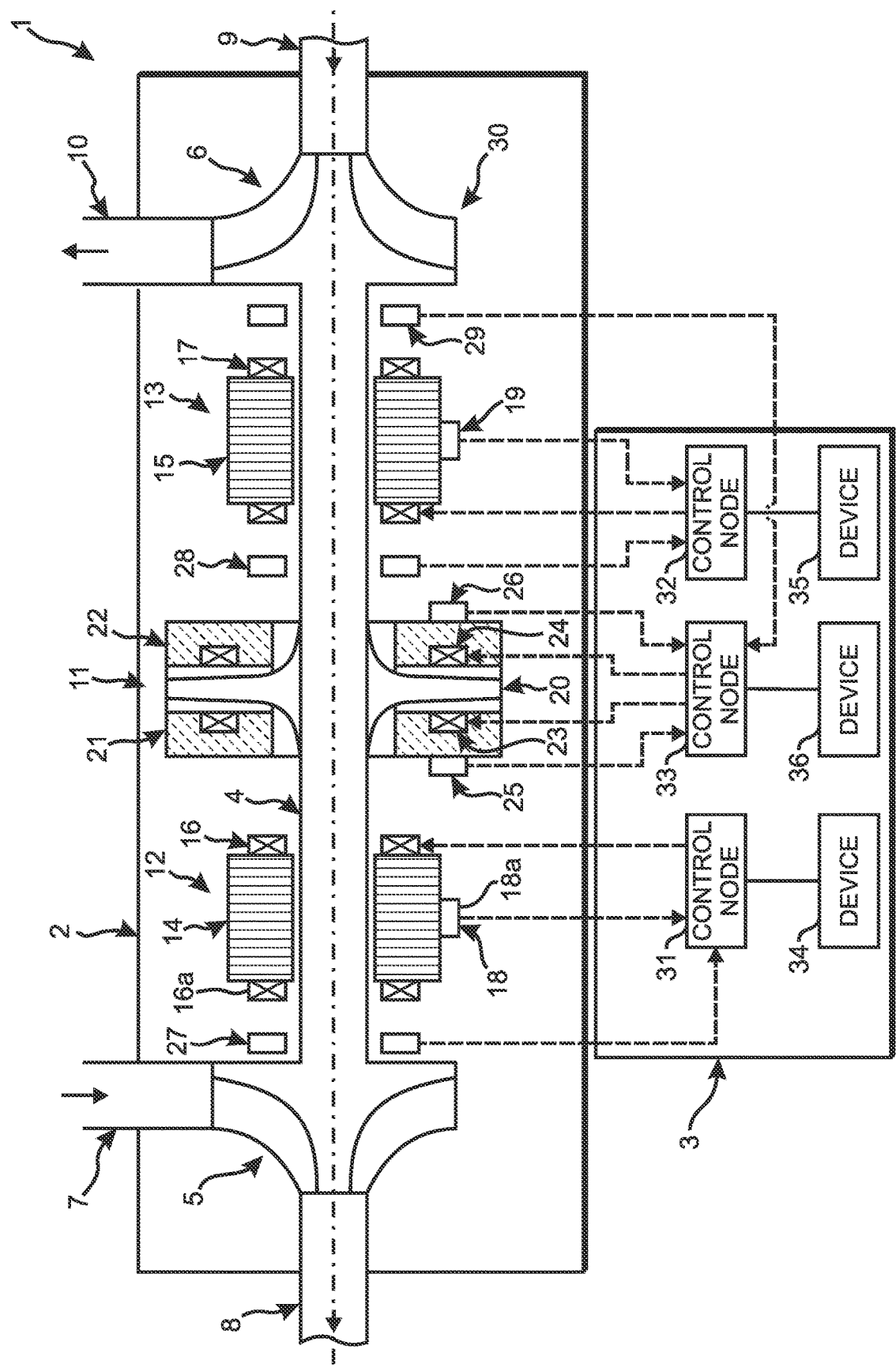
FIG. 1 illustrates an example of a magnetic suspension system according to the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows an example of a magnetic suspension system 1 intended, for example, for an underwater application, comprising a magnetic suspension rotary machine 2 and a device 3 for controlling the machine.

The rotary machine 2 comprises, for example, a turboexpander resting on a seabed for compressing and conveying a first gas fluid using the effort from the expansion of a second pressurised gas fluid extracted from an underwater gas well.

The control device 3 is located, for example, on an oil platform or in cylinders resting on the seabed.

Of course, the rotary machine 2 can comprise another type of rotary machine such as a pump.

The machine 2 comprises a shaft 4 comprising a first wheel 5 at a first end and a second wheel 6 at a second opposite end, a high-pressure inlet 7 and a low-pressure outlet 8 connected to the first wheel 5 and a low-pressure inlet 9 and a high-pressure outlet 10 connected to the second wheel 6.

The second pressurised fluid introduced into the high-pressure inlet 7 drives the first wheel 5 and exits the machine 2 in an expanded state via the low-pressure outlet 8.

The first wheel 5 drives the second wheel 6 via the shaft 4.

The second wheel 6 compresses the first fluid circulating via the low-pressure inlet 9 and discharges the compressed first fluid via the high-pressure outlet 10.

The first wheel 5, driven by the expansion of the second pressurised fluid, drives the second wheel 6 compressing the second fluid.

The shaft 4 comprises an axial stop 11 located, for example, in the middle of the shaft 4, and two radial magnetic bearings 12, 13 rotatably supporting the shaft 4.

A first radial magnetic bearing 12 is located between the first wheel 5 and the axial stop 11. The second radial magnetic bearing 13 is located between the second wheel 5 and the axial stop 11.

As an alternative embodiment, the axial stop 11 could be located in another location on the shaft 4, with the bearings 12 and 13 each being located on either side of the axial stop 11 or on the same side of the axial stop 11.

Each bearing 12, 13 comprises a yoke 14, 15 supporting, for example, four identical radial stator coils 16, 17 and up to four identical temperature sensors 18, 19 measuring the temperature in the vicinity of the four coils of each bearing 12, 13.

The coils 16, 17 comprise a set of windings so as to create a magnetic field that keeps the shaft 4 levitated in the bearings 12, 13.

The axial stop 11 comprises a disc-shaped stop rotor 20 rigidly connected to the shaft 4 and interposed between two stators 21, 22, each respectively comprising one or more axial stator coils 23, 24.

Each stator 21, 22 further comprises a temperature sensor 25, 26 measuring the temperature of the coil 23, 24 of the stator.

The machine 2 further comprises means 27, 28 for measuring the radial position of the shaft 4 each located in the vicinity of a different bearing 12, 13, and means 29 for measuring the axial position of the shaft 4 located between the second bearing 13 and the second wheel 6.

As an alternative embodiment, the means 29 for measuring the axial position of the shaft 4 could be located between the first bearing 12 and the first wheel 5.

According to yet another alternative embodiment, the measuring means 29 can comprise two axial sensors each disposed at a different end of the shaft 4 so as to take into account the elongation of the shaft 4 under the effect of the centrifugal force when it is driven by a rotational movement.

The measuring means 27, 28, 29 comprise inductive sensors, for example.

The coils 16, 17, 23, 24 are controlled in terms of current or magnetic flux by the control device 3 on the basis of the measurement results from the means 27, 28 for measuring the radial position of the shaft 4 and the means 29 for measuring the axial position of the shaft 4.

The coils 16, 17 generate magnetic fields so that the shaft 4 is levitated in the bearings 12, 13, and the axial coils 23, 24 generate a magnetic field so as to correct the axial position of the shaft 4 relative to a target axial position.

The shaft 4, the disc of the stop rotor 20 and the wheels 5, 6 form a rotor 30 suspended in the bearings 12, 13.

Of course, the shaft 4 can be supported by more than two bearings 12, 13.

It can further comprise more than one axial stop 11.

The control device 3 comprises three control nodes 31, 32, 33 or servo-control circuits for servo-controlling the position of the rotor 30 on an equilibrium position, and devices 34, 35, 36 for estimating the temperature of the stator coils 16, 17, 23, 24.

A first device 34 is connected to the first node 31, a second device 35 is connected to the second node 32 and the third device 36 is connected to the third node 33.

The devices 34, 35, 36 have an identical architecture.

Each control node 31, 32, 33 comprises one or more processing units and one or more power converters controlled by the one or more processing units (not shown), with the power converters powering the stator coils 16, 17, 23, 24.

The control node 31 controls the stator coils 16 of the first bearing 12 as a function of the measurement results provided by the means 27 for measuring the radial position of the shaft 4 and the temperature sensors 18. The control node 32 controls the stator coils 17 of the second bearing 13 as a function of the measurement results provided by the means 28 for measuring the radial position of the shaft 4 and the temperature sensors 19. The third control node 33 controls the axial coils 23, 24 as a function of the measurement results provided by the means 29 for measuring the axial position of the shaft 4 and the temperature sensors 25, 26.

Figure 2:
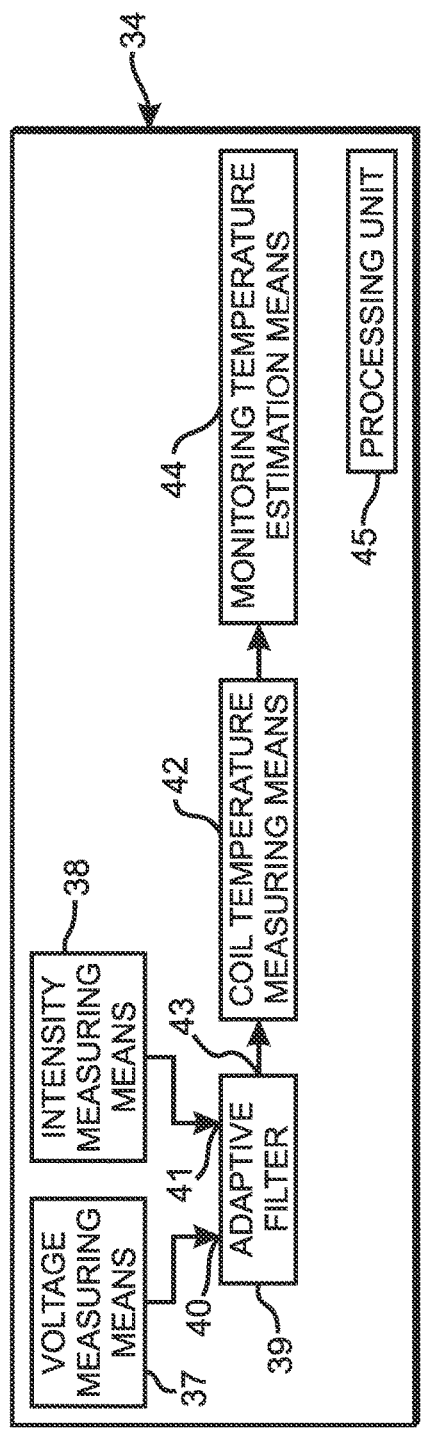
FIG. 2 shows a first embodiment of a device for estimating the temperature of stator coils according to the invention.

As the devices 34, 35, 36 have an identical architecture, only one example of the first device 34 is detailed in FIG. 2.

As the four radial stator coils 16, 17 are identical and the four temperature sensors 18, 19 are identical, it is assumed that the first device 34 is connected to one of the radial stator coils 16 and to one of the sensors 18.

It is assumed hereafter that reference sign 16a denotes the coil and that reference sign 18a denotes the sensor.

Of course, when the first device 34 is connected to the set of radial stator coils 16, the temperature of each coil of the set of radial stator coils 16 is estimated in the same way as for the coil 16a. The device 34 comprises means 37 for measuring the electric voltage at the terminals of the connection wires of the stator coil 16a and means 38 for measuring the intensity of the current passing through the stator coil 16a.

The device 34 further comprises an adaptive filter 39 comprising a first input 40 and a second input 41 respectively connected to the means 37 for measuring the electric voltage and the means 38 for measuring the current intensity, with the filter 39 estimating the electric resistance of the stator coil and the connection wires on the basis of the measured electric voltage and the intensity of the measured current.

The device 34 comprises means 42 for estimating the temperature of the coil connected to an output 43 of the adaptive filter 39, and estimating the value of the resistance of the stator coil on the basis of the resistance estimated by the adaptive filter 39.

The connection wires connect the means 37 for measuring the electric voltage and the means 38 for measuring the current intensity.

It is assumed that the resistance of the connection wires is constant or negligible compared to the resistance of the coil 16a.

As the rotary machine rests on a seabed, the resistance of the connection wires is constant because the water temperature is assumed to be constant at these depths.

As an alternative embodiment, the rotary machine 2 can be located on land.

In order to prevent any ohmic losses of the connection wires from interfering with the devices 34, 35, 36 estimating the temperature in the coils 16, the machine 2 and the control device 3 are located nearby in order to reduce the length of the wires and/or the machine 2 and the control device 3 are located in an environment with little temperature variation.

When the length of the connection wires is short, for example, when the machine 2 is located near the control device 3, the resistance of the connection wires is considered to be low compared to the resistance of the radial stator coils 16, 17 and the axial stator coils 23, 24.

The means 37 for measuring the electric voltage comprise, for example, a voltage sensor, and the means 38 for measuring the current intensity comprise, for example, a current sensor.

The device 34 further comprises means 44 for estimating a monitoring temperature of the coil 16a and a processing unit 45 implementing the adaptive filter 39, the means 42 for estimating the temperature and the means 44 for estimating a monitoring temperature.

In a first embodiment, it is assumed that the evolution of the temperature of the coil 16a is slow so that the inductive part of the coil 16a is neglected and its impedance is modelled by a resistance $R_{est}$, and that there is no phase shift between the voltage measured by the means 37 for measuring the electric voltage and the current intensity measured by the means 38 for measuring the current intensity.

The adaptive filter 39 estimates the resistance $R_{est}$ of the coil 16a on the basis of the following differential equation:

$$\frac{dR_{est}}{dt} = \lambda_R(U_f - R_{est}I_f), \quad (1)$$

where Uf is a filtered voltage measured by the means 37 for measuring the electric voltage and If is a filtered current measured by the means 38 for measuring the current intensity, and $\lambda_R$ is a convergence gain with a strictly positive value, for example, equal to 1.

Figure 3:
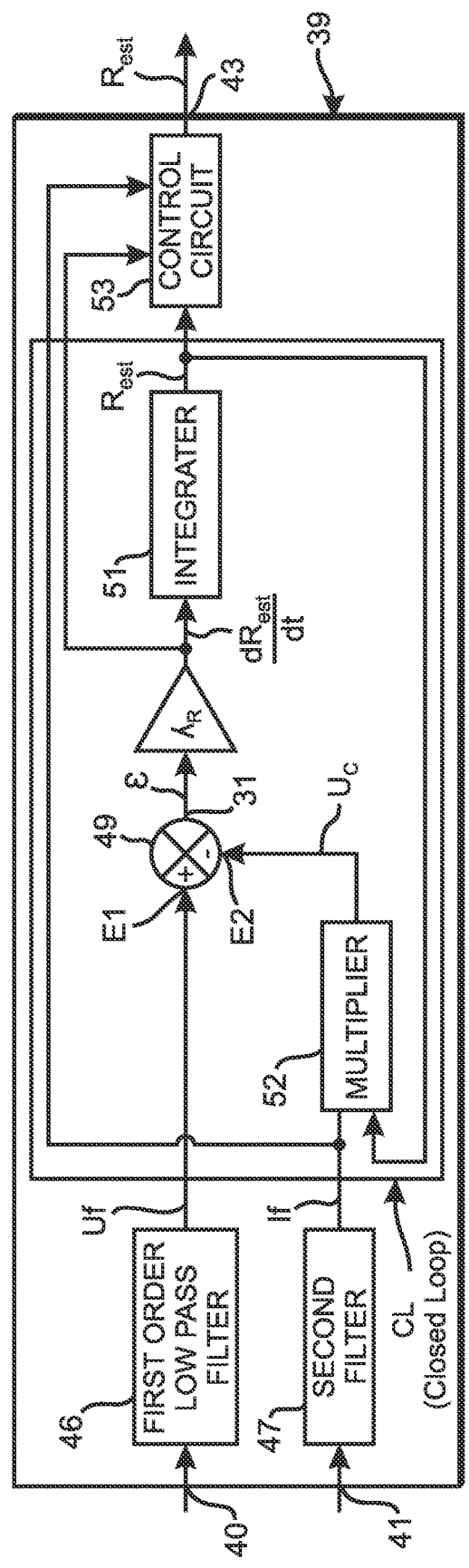
FIG. 3 show a first embodiment of a device for estimating the temperature of stator coils according to the invention.

FIG. 3 shows a block diagram of the adaptive filter 39 implementing equation (1).

The block diagram comprises a closed correction loop CL, a first first-order low-pass filter 46 connected to the first input 40 and filtering the voltage received from the means 37 for measuring the electric voltage, a second first-order low-pass filter 47 connected to the second input 41 and filtering the current value received from the means 38 for measuring the current intensity.

The time constant of the first and second filters 46, 47 is selected so that the evolution of the filtered voltage Uf filtered by the first filter 46 is slow and so that the evolution of the filtered current If filtered by the second filter 47 is slow.

The time constant of the first and second filters 46, 47 is equal to 3 seconds, for example.

The closed loop CL comprises a subtractor 49 comprising an addition input E1 connected to an output of the first filter 46 and a subtraction input E2.

A differential signal ε equal to the difference between the voltage Uf and Uc is transmitted on an output S1 of the subtractor 49.

The differential signal ε is transmitted to the input of the gain $\lambda_R$. An output of the gain $\lambda_R$ provides the time derivative $$\frac{dRest}{dt}$$

of the estimated resistance $R_{est}$.

The time derivative $$\frac{dRest}{dt}$$

is introduced into an integrator 51. An output of the integrator 51 provides the estimated resistance $R_{est}$.

The computed voltage Uc is determined by multiplying the intensity of the filtered current If by the estimated resistance $R_{est}$.

The value of the estimated resistance $R_{est}$ is equal to the value when the absolute value of the differential signal ε is less than or equal to a predetermined value, for example, to $1.5 \times \lambda_R$.

In order to improve the reliability of the estimated resistance $R_{est}$, in particular in the event of the failure of the control node 31, the value of the estimated resistance $R_{est}$ determined by the integrator 51 is introduced on a first input of a control circuit 53 that is connected to the output of the integrator 51 and an output of the control circuit 53 that is connected to the output 43 of the adaptive filter 39.

A second input of the control circuit 53 is connected to the output of the gain $\lambda_R$ and a third input of the control circuit 53 is connected to the output of the second filter 47.

The control circuit 53 compares the intensity of the filtered current If to an activation threshold and the time derivative $$\frac{dRest}{dt}$$

to an inactivation threshold.

If the intensity of the filtered current If is above the activation threshold and the time derivative $$\frac{dRest}{dt}$$

is below the inactivation threshold, the control circuit 53 delivers the value of the estimated resistance $R_{est}$ to the output of the integrator 51.

If the intensity of the filtered current If is below the activation threshold or the time derivative $$\frac{dRest}{dt}$$

is above the inactivation threshold, the value of the time derivative $$\frac{dRest}{dt}$$

is set to zero by setting the gain value $\lambda_R$ to zero so that the last value of the estimated resistance $R_{est}$, when the intensity of the measured current is above the activation threshold and the time derivative of the estimated electric resistance is below the inactivation threshold, is assigned to the estimated resistance $R_{est}$.

The activation threshold is equal to 3 A, for example.

The inactivation threshold is equal to 1.5° C./s, for example.

The value of the estimated resistance $R_{est}$ is delivered to the means 42 for estimating temperature, which determine the core temperature of the coil 16a on the basis of Matthiessen's rule connecting the estimated temperature Test at the core of the coil 16a to the estimated electric resistance $R_{est}$, to an electric resistance value of the material R(To) of the coil at a reference temperature To and to a characteristic temperature of the material Tm of the coil at which the material has zero resistance at a pressure of 1 bar.

$$\text{Test} = T_m + (T_0 - T_m) \frac{\text{Rest}}{R(T_0)}. \quad (2)$$

It is assumed that the coils 16, 17, 23, 24 are made of copper.

Equation (2) is expressed as:

$$\text{Test} = T_{Cu} + (T_0 - T_{Cu}) \frac{\text{Rest}}{R(T_0)}, \quad (3)$$

where the temperature $T_{Cu}$ is equal to −234.5° C. corresponding to zero electric resistance of the copper at a pressure of 1 bar.

The estimated temperature Test is equal to the temperature at the core of the coil 16a.

However, in order to ensure the redundancy of the temperature measurement of the coil 16a, the temperature measured by the temperature sensor 18a located on the periphery of the coil 16a needs to be estimated by taking into account thermal exchanges between the coil 16a and the sensor 18a.

Thermal exchanges are modelled by the means 44 for estimating a monitoring temperature comprising a first-order filter in accordance with the following equation:

$$\frac{dT_{probe,est}}{dt} = -\frac{1}{\tau_{probe}} T_{probe,est} + \frac{1}{\tau_{probe}} T_{est}, \quad (4)$$

where $T_{probe,est}$ is the monitoring temperature similar to the temperature read by the sensor 18a and $\tau_{probe}$ is a time constant determined empirically or by digital simulation.

Figure 4:
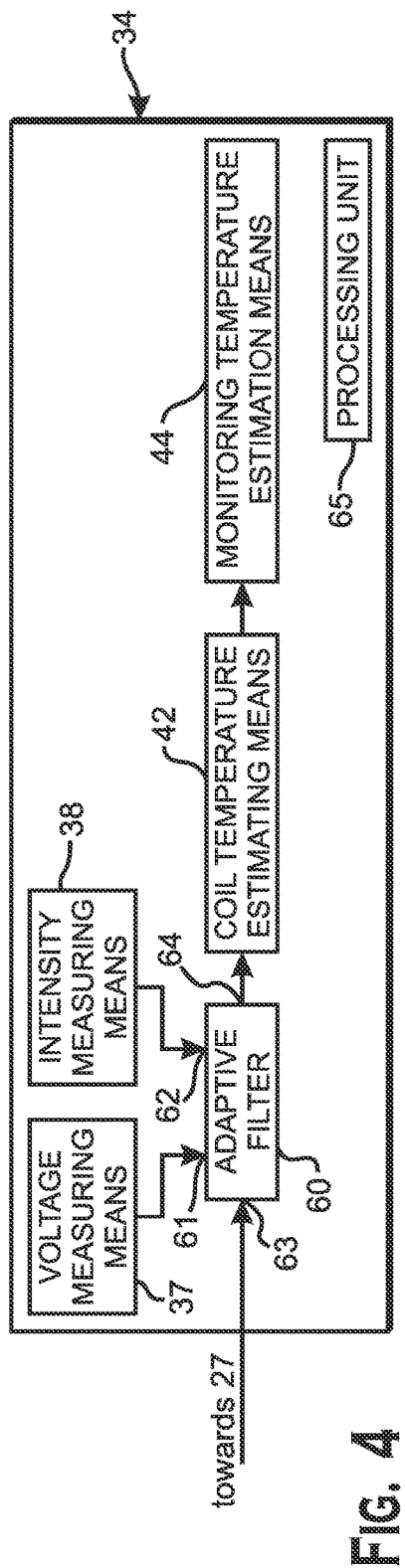
FIG. 4 shows a second embodiment of the device for estimating the temperature of the stator coils according to the invention.

FIG. 4 illustrates a second embodiment of the device 34.

The device 34 comprises the means 37 for measuring the electric voltage, as well as the means 38 for measuring the current intensity.

The device 34 further comprises the means 42 for estimating the temperature and the means 44 for estimating a monitoring temperature.

The device 34 comprises an adaptive filter 60 comprising a first input 61 connected to the means 37 for measuring the electric voltage, a second input 62 connected to the means 38 for measuring the current intensity, a third input 63 connected to the means 27 for measuring the radial position of the shaft 4 each located near a bearing 12, and an output 64 connected to the means 42 for estimating the temperature.

The means 42 for estimating the temperature and the means 44 for estimating a monitoring temperature are connected together as previously described.

The device 34 further comprises a processing unit 65 implementing the adaptive filter 60, the means 42 for estimating temperature and the means 44 for estimating a monitoring temperature.

The adaptive filter 60 estimates the electric resistance $R_{est}$ of the stator coil 16a and the connection wires on the basis of the measured electric voltage, the intensity of the measured current, and the radial position of the shaft 4.

The filter 60 takes into account the impedance of the coil 16a in order to model the transient evolution of the resistance of the coil 16a.

It is assumed that the evolution of the resistance R of the coil 16a is very small compared to the dynamics of the magnetic flux of the coil 16a so that:

$$\frac{dR}{dt} = 0. \quad (5)$$

The adaptive filter 60 estimates the resistance $R_{est}$ of the coil 16a on the basis of the following differential system:

$$\frac{d\Phi_{est}}{dt} = -\frac{R_{est}}{L(z,I)} \Phi_{est} + U - \lambda_{\Phi est}(I_{est} - I) \quad (6)$$

$$\frac{dR_{est}}{dt} = -\lambda_{R2}(I_{est} - I) \quad (7)$$

$$I_{est} = \frac{\Phi_{est}}{L(z,I)}, \quad (8)$$

where $\Phi_{es}$ is the estimated magnetic flux generated by the coil 16a, L(z, I) is the inductance of the coil 16a in the radial position of the shaft 4, I is the current measured by the means 38 for measuring the current intensity, $\lambda_{R2}$ and $\lambda_{\Phi est}$ are empirically adjusted first and second convergence gains, and $I_{est}$ is the intensity of the estimated current circulating in the coil 16a.

Figure 5:
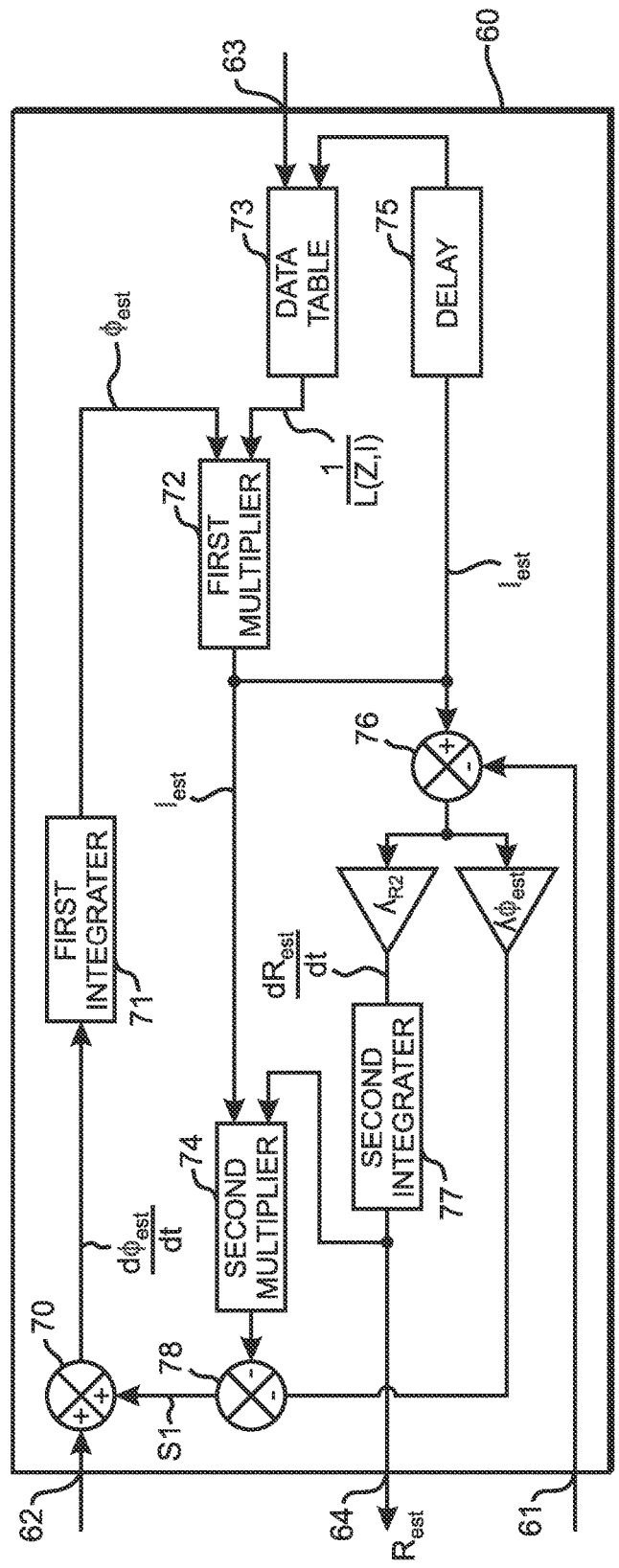
FIG. 5 show a second embodiment of the device for estimating the temperature of the stator coils according to the invention.

FIG. 5 shows a block diagram of the adaptive filter 60 implementing the system of differential equations (6), (7), (8).

The block diagram comprises an adder 70 comprising a first input connected to the second input 62 of the adaptive filter 60, a second input receiving a signal S1, and an output providing the time derivative of the estimated magnetic flux $$\frac{d\Phi_{est}}{dt}$$

generated by the coil 16a.

The output of the adder 70 is connected to an input of a first integrator 71. The first integrator 71 comprises an output connected to a first input of a first multiplier 72 and providing the estimated magnetic flux $\Phi_{est}$.

The first multiplier 72 comprises a second input connected to an output of a data table 73, and an output connected to a first input of a second multiplier 74, with the output of the first multiplier 72 providing the intensity of the estimated current $I_{est}$.

The data table 73 further comprises a first input connected to the third input 63 of the adaptive filter 60, and a second input connected to the output of a delay 75.

The delay 75 comprises an input connected to the output of the first multiplier 72.

The data table 73 connects the inverse of the value of the impedance of the coil 16a as a function of the position of the shaft 4 provided on the third input 63 and the intensity of the delayed estimated current $I_{est}$ delivered by the delay 75. The value of the delay 75 is, for example, equal to 17 µs and avoids an algebraic loop between the output of the data table 73 via the multiplier 72 and the second input of the table 73.

The output of the first multiplier 72 is also connected to an addition input of a subtractor 76.

A subtraction input of the subtractor 76 is connected to the first input 61 of the filter 60, and an output of the subtractor 76 is connected to the input of the first gain $\lambda_{R2}$ and the second gain $\lambda_{\Phi est}$.

An output of the first gain $\lambda_{R2}$ is connected to an input of a second integrator 77 and provides the time derivative $$\frac{dR_{est}}{dt}$$

of the estimated resistance.

The second integrator 77 comprises an output connected to the output 64 of the filter 60 and providing the estimated resistance $R_{est}$.

An output of the second multiplier 74 is connected to a first subtraction input of a subtractor 78 and an output of the second gain $\lambda_{\Phi est}$ is connected to a second input of the subtractor 78.

An output of the subtractor 78 is connected to a second addition input of the adder 70.

The adaptive filter 60 implemented by the processing unit 65 regulates the value of the estimated electric resistance $R_{est}$ in a closed loop on the basis of a deviation between the current passing through the stator coil measured by the means 37 for measuring the electric voltage and the intensity of the estimated current $I_{est}$ on the basis of the voltage measured by the means 36 and the position of the shaft 4 measured by the means 27 in the stator of the magnetic bearing.

The value of the estimated electric resistance $R_{est}$ is equal to the value of the regulated estimated electric resistance when the deviation is zero to the nearest tolerance.

The adaptive filter 60 can further comprise the control circuit 53 in order to improve the reliability of the estimated resistance $R_{est}$.

The first input of the control circuit 53 is connected to the output of the second integrator 77, the second input of the control circuit 53 is connected to the gain output $\lambda_{R2}$, the third input of the control circuit 53 is connected to the first input 61 of the filter 60, and the output of the control circuit 53 is connected to the output 64 of the filter 60.

Figure 6:
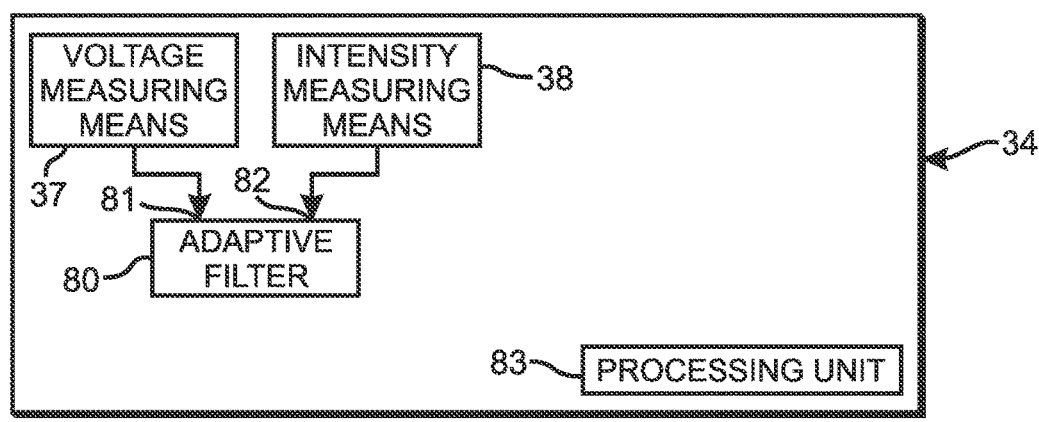
FIG. 6 shows a third embodiment of the device for estimating the temperature of the stator coils according to the invention.

FIG. 6 illustrates a third embodiment of the first device 34.

The device 34 comprises:
means 37 for measuring the electric voltage;
means 38 for measuring the current intensity; and
an adaptive filter 80 comprising a first input 81 connected to the means 37 for measuring the electric voltage, and a second input 82 connected to the means 38 for measuring the current intensity.

The device 34 further comprises a processing unit 83 implementing the adaptive filter 80.

The adaptive filter 80 comprises a recursive least squares algorithm for defining an affine relationship between the measured voltage and current intensity and the estimated electric resistance $R_{est}$ and a measurement bias of at least one of the electric voltage values measured by the means 37 for measuring the electric voltage and the current measured by the means 38 for measuring the current intensity.

The adaptive filter 80 allows a measurement bias to be corrected, with the measured value being the voltage and/or the current slowly evolving over time in order to obtain a more reliable estimate of the resistance $R_{est}$ than when estimating the resistance $R_{est}$ using the first and second embodiments of the device 34.

Indeed, a small variation in the estimated resistance $R_{est}$ results in a significant variation in the estimated temperature Test.

The recursive least squares algorithm will now be described.

Let:
$I_{m,k}$ be the intensity of a current measured by the means 38 for measuring the intensity of electric currents at an instant k;
$U_{m,k}$ be a voltage measured by the means 37 for measuring the electric voltage at the instant k;
$\hat{X}_k \triangleq (\hat{R}_k \ \hat{b}_k)^T$ be an observation vector, in which $\hat{R}_k$ is the estimated resistance $R_{est}$ and $\hat{b}_k$ is a measurement bias;
$e_k$ be the estimate of the a priori error;
$\varphi_k \triangleq (I_{m,k} \ 1)^T$ be an input vector;
$y_k \triangleq U_{m,k}$ be an output vector;
$K_k \triangleq (k_{R,k} \ k_{b,k})^T$ be the adaptation gain; and
$P_k \triangleq$ $$\begin{pmatrix} p_{11,k} & p_{12,k} \\ p_{21,k} & p_{22,k} \end{pmatrix}$$

be a covariance error matrix.

The following initial magnitudes are also noted:
$\hat{X}_0 = (R_0 \ 0)^T$ is the initial observation vector, in which $R_0$ is the resistance of the coil 16a measured prior to powering on the magnetic suspension system; and $$P_0 = \begin{pmatrix} p & 0 \\ 0 & p \end{pmatrix}$$

is the initial covariance error matrix, in which p is an actual value such that p>>1.

At each instant k, the adaptation gain $K_k$ is updated.

The denominator $den_{k+1}$ of the adaptation gain $K_k$ is computed as follows:

$$den_{k+1} = p_{11,k} I_{m,k-1}^2 + (p_{12,k} + p_{21,k}) I_{m,k+1} + p_{22,k} + \frac{\lambda}{\mu}, \quad (9)$$

where $\lambda$ is a constant forgetting factor ranging between 0 and 1, and $\mu$ is equal to 1.

The coefficients of the adaptation gain are computed as follows:

$$\begin{cases} k_{R,k+1} = \dfrac{p_{11,k} I_{m,k+1} + p_{12,k}}{den_{k+1}} \\ k_{b,k+1} = \dfrac{p_{21,k} I_{m,k+1} + p_{22,k}}{den_{k+1}} \end{cases} \quad (10)$$

The estimate of the a priori error $e_k$ is computed as follows:

$$e_{k+1} = U_{m,k+1} - \hat{R}_k I_{m,k+1} - \hat{b}_k \quad (11).$$

The observation vector $\hat{X}_k$ is updated as follows:

$$\hat{R}_{k+1} = \hat{R}_k + k_{R,k+1} e_{k+1} \quad (12)$$

$$\hat{b}_{k+1} = \hat{b}_k + k_{b,k+1} e_{k+1} \quad (13).$$

The updated value at the instant k+1 of the temperature $\hat{T}_{k+1}$ at the centre of the coil 16a is determined as follows:

$$\hat{T}_{k+1} = T_m + (T_0 - T_m)\frac{\hat{R}_{k+1}}{R(T_0)}. \quad (14)$$

The updated value at the instant k+1 of the monitoring temperature $\hat{T}_{probe,k+1}$ of the coil 16a is determined as follows:

$$\hat{T}_{probe,k+1} = \frac{2\tau_{probe} - T_s}{2\tau_{probe} + T_s}\hat{T}_{probe,k} + \frac{T_s}{2\tau_{probe} + T_s}(\hat{T}_{k+1} + \hat{T}_k), \quad (15)$$

where Ts is the period in which the signals entering the algorithm are sampled.

The intermediate values $v_{k+1}$ and $w_{k+1}$ are computed as follows:

$$\begin{cases} v_{k+1} = p_{11,k}I_{m,k+1} + p_{21,k} \\ w_{k+1} = p_{12,k}I_{m,k+1} + p_{22,k} \end{cases}. \quad (16)$$

The covariance error matrix $P_k$ is currently updated as follows:

$$\begin{cases} p_{11,k+1} = (p_{11,k} - k_{R,k+1}v_{k+1}) \\ p_{12,k+1} = (p_{12,k} - k_{R,k+1}w_{k+1}) \\ p_{21,k+1} = (p_{21,k} - k_{b,k+1}v_{k+1}) \\ p_{22,k+1} = (p_{22,k} - k_{b,k+1}w_{k+1}) \end{cases}. \quad (17)$$

The adaptive filter 80 can further comprise the control circuit 53 for improving the reliability of the estimated resistance $R_{est}$.

The means 37 for measuring the electric voltage and the means 38 for measuring the current intensity are connected to an analogue-to-digital converter.

If the resolution of the converter (quantum) is not sufficient, the estimation of the estimated resistance $R_{est}$ is not very accurate, resulting in a rough estimation of the temperatures $T_{est}$ and $T_{probe}$.

For example, for a 12-bit analogue-to-digital converter with a voltage range ranging between −300V and +300V, the voltage quantum is equal to 0.146 V.

For a coil resistance of 0.3Ω, the voltage quantum corresponds to a temperature quantum of 8.3° C.

In order to increase the accuracy of the measurements, a moving average of the sampled signals is generated in order to increase the number of significant digits without using a dedicated voltage measurement circuit.

The averaging can be carried out, for example, by a first-order low pass filter with a time constant equal to 1 second, for example.

In the cited example, the effective number of bits (ENOB) is increased by more than 7 bits. This allows a smaller voltage and current quantum to be recovered that is equal to 1.14 mV corresponding to a temperature quantum of 0.035° C. for the coil resistance of 0.3Ω.

The temperature estimation device 34 allows the temperature of the stator coils 16, 17, 23, 24 to be estimated on the basis of adaptive filters.

Implementing adaptive filter algorithms does not require implementing a dedicated circuit for accurately measuring the current passing through each coil and the voltage at the terminals of each coil.

The first embodiment of the device 34 allows a quick and simple estimate to be acquired of the temperature of the stator coils in a steady state.

The second embodiment of the device 34 takes into account the inductive part of the coils by observing the generated magnetic flux. This allows a more accurate estimate to be acquired of the temperature of the stator coils than that provided by the first and third embodiments of the device 34.

However, the first and second embodiments of the device 34 assume that there is sufficient compensation of the measured voltage and current shift.

The third embodiment of the device 34 allows a bias to be taken into account in one of the measured voltage and current values.

The algorithm implemented in the third embodiment of the device 34 is more reliable than that implemented in the first and second embodiments of the device 34.

The first and third embodiments of the device 34 could be connected to a magnetic flux observer in order to improve the estimation of the magnetic flux.

The estimated resistance $R_{est}$ could be used to improve the control of the magnetic flux of the bearings 12, 13.

The invention claimed is:

1. A method for estimating the temperature of a stator coil of a magnetic suspension bearing of a rotor and which is connected by connection wires to circuits for servo-controlling the position of the rotor, comprising:
    measuring the electric voltage at the terminals of the connection wires of the stator coil wherein the measuring of the electric voltage comprises sampling a plurality of signals to determine so as to increase the accuracy of the electric voltage measurement without using a dedicate voltage measurement circuit;
    measuring the intensity of the current passing through the stator coil;
    estimating the electric resistance of the stator coil and of the connection wires based on an adaptive filter, the measured electric voltage and the intensity of the measured current; and
    estimating the temperature of the coil based on the value of the estimated resistance.

2. A method for estimating the temperature of a stator coil of a magnetic suspension bearing of a rotor and which is connected by connection wires to circuits for servo-controlling the position of the rotor, comprising:
    measuring the electric voltage at the terminals of the connection wires of the stator coil;
    measuring the intensity of the current passing through the stator coil;
    estimating the electric resistance of the stator coil and of the connection wires based on an adaptive filter, the measured electric voltage and the intensity of the measured current and estimating the temperature of the coil based on the value of the estimated resistance,
    wherein estimating the electric resistance of the stator coil and of the connection wires comprises:
    filtering the measured electric voltage using a first-order filter;
    filtering the intensity of the measured current using a first-order filter;
    correcting the value of the estimated electric resistance in a closed loop on the basis of a deviation between the filtered voltage and the product of the estimated electric resistance and the intensity of the filtered current so that the deviation is zero, with the value of the estimated electric resistance being equal to the value of the corrected estimated electric resistance when the absolute value of the deviation is less than or equal to a predetermined value.

3. A method for estimating the temperature of a stator coil of a magnetic suspension bearing of a rotor and which is connected by connection wires to circuits for servo-controlling the position of the rotor, comprising:
  measuring the electric voltage at the terminals of the connection wires of the stator coil
  measuring the intensity of the current passing through the stator coil;
  estimating the electric resistance of the stator coil and of the connection wires based on an adaptive filter, the measured electric voltage and the intensity of the measured current and estimating the temperature of the coil based on the value of the estimated resistance,
  wherein estimating the electric resistance of the stator coil and of the connection wires comprises correcting the value of the electric resistance estimated in a closed loop on the basis of a deviation between the intensity of the current passing through the stator coil and the intensity of a current estimated on the basis of the measured voltage and the position of the rotor shaft in the stator of the magnetic bearing, with the value of the estimated electric resistance being equal to the value of the corrected estimated electric resistance when the absolute value of the deviation is less than or equal to a predetermined value.

4. A method for estimating the temperature of a stator coil of a magnetic suspension bearing of a rotor and which is connected by connection wires to circuits for servo-controlling the position of the rotor, comprising:
  measuring the electric voltage at the terminals of the connection wires of the stator coil;
  measuring the intensity of the current passing through the stator coil;
  estimating the electric resistance of the stator coil and of the connection wires based on an adaptive filter, the measured electric voltage and the intensity of the measured current and estimating the temperature of the coil based on the value of the estimated resistance,
  wherein the adaptive filter comprises a recursive least squares algorithm, estimating the electric resistance of the stator coil and connection wires on the basis of an adaptive filter, the measured electric voltage and the intensity of the measured current comprises implementing the recursive least squares algorithm in order to define an affine relationship between the measured voltage and current intensity and the estimated electric resistance and a measurement bias of at least one of the measured values.

5. A method for estimating the temperature of a stator coil of a magnetic suspension bearing of a rotor and which is connected by connection wires to circuits for servo-controlling the position of the rotor, comprising:
  measuring the electric voltage at the terminals of the connection wires of the stator coil;
  measuring the intensity of the current passing through the stator coil;
  estimating the electric resistance of the stator coil and of the connection wires based on an adaptive filter, the measured electric voltage and the intensity of the measured current and estimating the temperature of the coil based on the value of the estimated resistance;
  comparing the intensity of the measured current passing through the stator coil to an activation threshold, and comparing the time derivative of the estimated electric resistance to an inactivation threshold, and wherein, if the intensity of the measured current is below the activation threshold or the time derivative of the estimated electric resistance is above the inactivation threshold, the method comprises assigning the last value of the estimated resistance to the estimated resistance when the intensity of the measured current is above the activation threshold and the time derivative of the estimated electric resistance is below the inactivation threshold.

6. A method for estimating the temperature of a stator coil of a magnetic suspension bearing of a rotor and which is connected by connection wires to circuits for servo-controlling the position of the rotor, comprising:
  measuring the electric voltage at the terminals of the connection wires of the stator coil;
  measuring the intensity of the current passing through the stator coil;
  estimating the electric resistance of the stator coil and of the connection wires based on an adaptive filter, the measured electric voltage, and the intensity of the measured current and estimating the temperature of the coil based on the value of the estimated resistance
  estimating the temperature of the coil on the basis of the value of the estimated resistance comprises computing the estimated temperature on the basis of Matthiessen's rule connecting the estimated temperature to the estimate of the electric resistance, to a value of the electric resistance of the material of the coil at a reference temperature and to a characteristic temperature of the material of the coil at which the material has zero resistance at a pressure of 1 bar.

* * * * *